United States Patent
Kuroki (10) Patent No.: US 12,430,575 B2
(45) Date of Patent: Sep. 30, 2025

(54) BEHAVIOR PREDICTION OF A VEHICLE PARTICIPATING IN VEHICLE-GRID INTEGRATION

(71) Applicant: TOYOTA JIDOSHA KABUSHIKI KAISHA, Toyota (JP)

(72) Inventor: Rentaro Kuroki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 883 days.

(21) Appl. No.: 17/684,474

(22) Filed: Mar. 2, 2022

(65) Prior Publication Data
US 2022/0300838 A1    Sep. 22, 2022

(30) Foreign Application Priority Data

Mar. 22, 2021  (JP) ................................. 2021-047777

(51) Int. Cl.
  *G06N 5/04*    (2023.01)
  *G06N 20/00*   (2019.01)
(52) U.S. Cl.
  CPC ............... *G06N 5/04* (2013.01); *G06N 20/00* (2019.01)
(58) Field of Classification Search
  None
  See application file for complete search history.

(56) References Cited

U.S. PATENT DOCUMENTS

| | | | | |
|---|---|---|---|---|
| 7,184,866 B2 * | 2/2007 | Squires | ..................... | B60L 3/12 |
| | | | | 701/34.3 |
| 8,694,232 B2 * | 4/2014 | Kono | ................. | G01C 21/3469 |
| | | | | 701/123 |
| 9,037,396 B2 * | 5/2015 | Pack | ....................... | G01C 21/20 |
| | | | | 701/409 |
| 9,224,299 B2 * | 12/2015 | Taguchi | ................. | G08G 1/163 |
| 9,495,874 B1 * | 11/2016 | Zhu | ................... | G08G 1/096741 |
| 9,859,709 B2 * | 1/2018 | Sakamoto | ............... | B60L 53/62 |
| 11,230,190 B2 * | 1/2022 | Koebler | ..................... | G06F 7/00 |
| 11,370,302 B2 * | 6/2022 | Koebler | ..................... | B60L 7/26 |
| 2007/0112475 A1 * | 5/2007 | Koebler | ............. | G01C 21/3617 |
| | | | | 701/1 |
| 2018/0053093 A1 * | 2/2018 | Olabiyi | ............. | B60W 50/0097 |
| 2019/0225236 A1 * | 7/2019 | Hashimoto | ........... | B60W 10/04 |
| 2020/0350764 A1 * | 11/2020 | Day | ........................ | B60L 53/63 |

FOREIGN PATENT DOCUMENTS

| | | |
|---|---|---|
| JP | 2016-134160 A | 7/2016 |
| JP | 2017-135926 A | 8/2017 |

* cited by examiner

*Primary Examiner* — Maikhanh Nguyen
(74) *Attorney, Agent, or Firm* — Finnegan, Henderson, Farabow, Garrett and Dunner, LLP (57) ABSTRACT

A device predicts the future behavior of a vehicle participating in vehicle-grid integration based on past behavior history of the vehicle, and acquires a user input value representing scheduled future behavior of the vehicle. A first integrated error is obtained by integrating an error between the predicted value and an actual value of the vehicle behavior during a predetermined period, and a second integrated error is obtained by integrating an error between the user input value and the actual value during the same period. The device determines that the user input value is a final predicted value of the future behavior of the vehicle when the first integrated error is smaller than the second integrated error, and determines that the predicted value is the final predicted value when the first integrated error is equal to or larger than the second integrated error.

6 Claims, 5 Drawing Sheets

BEHAVIOR PREDICTION OF A VEHICLE PARTICIPATING IN VEHICLE-GRID INTEGRATION

CROSS-REFERENCE TO RELATED APPLICATION

This application claims priority to Japanese Patent Application No. 2021-047777 filed on Mar. 22, 2021 incorporated herein by reference in its entirety.

BACKGROUND

1. Technical Field

The present disclosure relates to a behavior prediction device, a behavior prediction method, and a behavior prediction program, capable of predicting behaviors of vehicles participating in vehicle-grid integration (VGI).

2. Description of Related Art

Nowadays research projects and studies on VGI have been carried out. VGI is a solution that enables electric vehicles (including pure electric vehicles using only batteries as an energy source, as well as plug-in hybrid vehicles) to serve as a part of power supply infrastructure. Japanese Unexamined Patent Application Publication No. 2016-134160 (JP 2016-134160 A) discloses one example of VGI. In the example disclosed in JP 2016-134160 A, past service record data of a vehicle is stored together with attribute data of a date when the data is acquired, including a date, a day of the week, and weather. A service plan of the vehicle is estimated from actual data corresponding to the attribute data similar to that of a prediction target date.

SUMMARY

However, the service plan of each vehicle is not always similar to past service experience. It is not possible to highly accurately predict behavior of the vehicle by using a prediction model based on the past service record data only. In a case of a vehicle that does not have a fixed behavior pattern, it is likely that the prediction model does not match the actual situation.

The present disclosure relates to a behavior prediction device, a behavior prediction method, and a behavior prediction program, capable of improving prediction accuracy for behaviors of vehicles participating in VGI.

The behavior prediction device according to a first aspect of the present disclosure includes at least one memory that stores at least one program, and at least one processor coupled to the at least one memory. The at least one processor executes the following first to sixth processes by executing the at least one program.

In the first aspect, a first process is a process of calculating a predicted value obtained by statistically predicting future behavior of the vehicle based on past behavior history of the vehicle. A second process is a process of acquiring a scheduled value that represents scheduled future behavior of the vehicle from a user who is using the vehicle. A third process is a process of calculating reliability of the predicted value based on an error between the predicted value based on the behavior history and an actual value of behavior of the vehicle during a predetermined period in the past. A fourth process is a process of calculating reliability of the scheduled value based on an error between the scheduled value acquired from the user and the actual value of behavior of the vehicle during the predetermined period. A fifth process is a process of determining, in a case where the scheduled value acquired from the user has higher reliability than the reliability of the predicted value based on the behavior history, that the scheduled value acquired from the user is a final predicted value for the future behavior of the vehicle. A sixth process is a process of determining, in a case where the scheduled value acquired from the user has reliability equal to or less than the reliability of the predicted value based on the behavior history, that the predicted value based on the behavior history is the final predicted value.

In the first aspect, the at least one processor may determine, in a case where the scheduled value acquired from the user includes a single scheduled value that represents a one-off schedule instead of a repeating schedule, the one-off scheduled value as the final predicted value, superseding the predicted value based on the behavior history. In the first aspect, the at least one processor may determine, in a case where the scheduled value acquired from the user includes a plurality of one-off scheduled values, the latest one-off scheduled value as the final predicted value. In the first aspect, the at least one processor may calculate an integrated value of the error between the predicted value based on the behavior history and the actual value as a numerical value associated with the reliability of the predicted value, and calculate an integrated value of the error between the scheduled value acquired from the user and the actual value as a numerical value associated with the reliability of the scheduled value.

The behavior prediction method according to a second aspect of the present disclosure includes the following first to sixth steps. A first step is a step of calculating a predicted value obtained by statistically predicting future behavior of the vehicle based on past behavior history of the vehicle. A second step is a step of acquiring a scheduled value that represents scheduled future behavior of the vehicle from a user who is using the vehicle. A third step is a step of calculating reliability of the predicted value based on an error between the predicted value based on the behavior history and an actual value of behavior of the vehicle during a predetermined period in the past. A fourth step is a step of calculating reliability of the scheduled value based on an error between the scheduled value acquired from the user and the actual value of behavior of the vehicle during the predetermined period. A fifth step is a step of determining, in a case where the scheduled value acquired from the user has higher reliability than the reliability of the predicted value based on the behavior history, that the scheduled value acquired from the user is a final predicted value for the future behavior of the vehicle. A sixth step is a step of determining, in a case where the scheduled value acquired from the user has reliability equal to or less than the reliability of the predicted value based on the behavior history, that the predicted value based on the behavior history is the final predicted value.

The behavior prediction program according to a third aspect of the present disclosure is a program that causes a computer to predict behavior of a vehicle engaging in VGI, which causes the computer to execute the first to sixth processes stated above.

With the behavior prediction device, the behavior prediction method, and the behavior prediction program according to each aspect of the present disclosure, not only the predicted value statistically predicted based on the past behavior history is calculated, but also the scheduled value representing the scheduled future behavior of the vehicle is acquired from the user. A value with higher reliability when considering past behavior experiences, from among the predicted value based on the behavior history and the scheduled value acquired from the user, is determined as the final predicted value. Consequently, it is possible to improve the prediction accuracy for the behavior of the vehicle engaging in VGI, and also to deal with a vehicle that does not have a fixed behavior pattern.

Moreover, in a case where the scheduled value acquired from the user includes the one-off scheduled value, the one-off scheduled value is determined as the final predicted value, superseding the predicted value based on the behavior history, and thus it is also possible to deal with a sudden schedule change or addition of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to drawings. However, in a case where the specific numeral number associated with elements, e.g., the number, quantity, or range, is referred to in the embodiments shown below, the gist of the present disclosure is not limited to such a number unless the number is specifically clarified or clearly specified in principle. Additionally, structures and configurations described in the embodiments shown below are not essential to the gist of the present disclosure, unless they are specifically clarified or clearly specified in principle.

1. Overall Configuration of VGI

Figure 1:
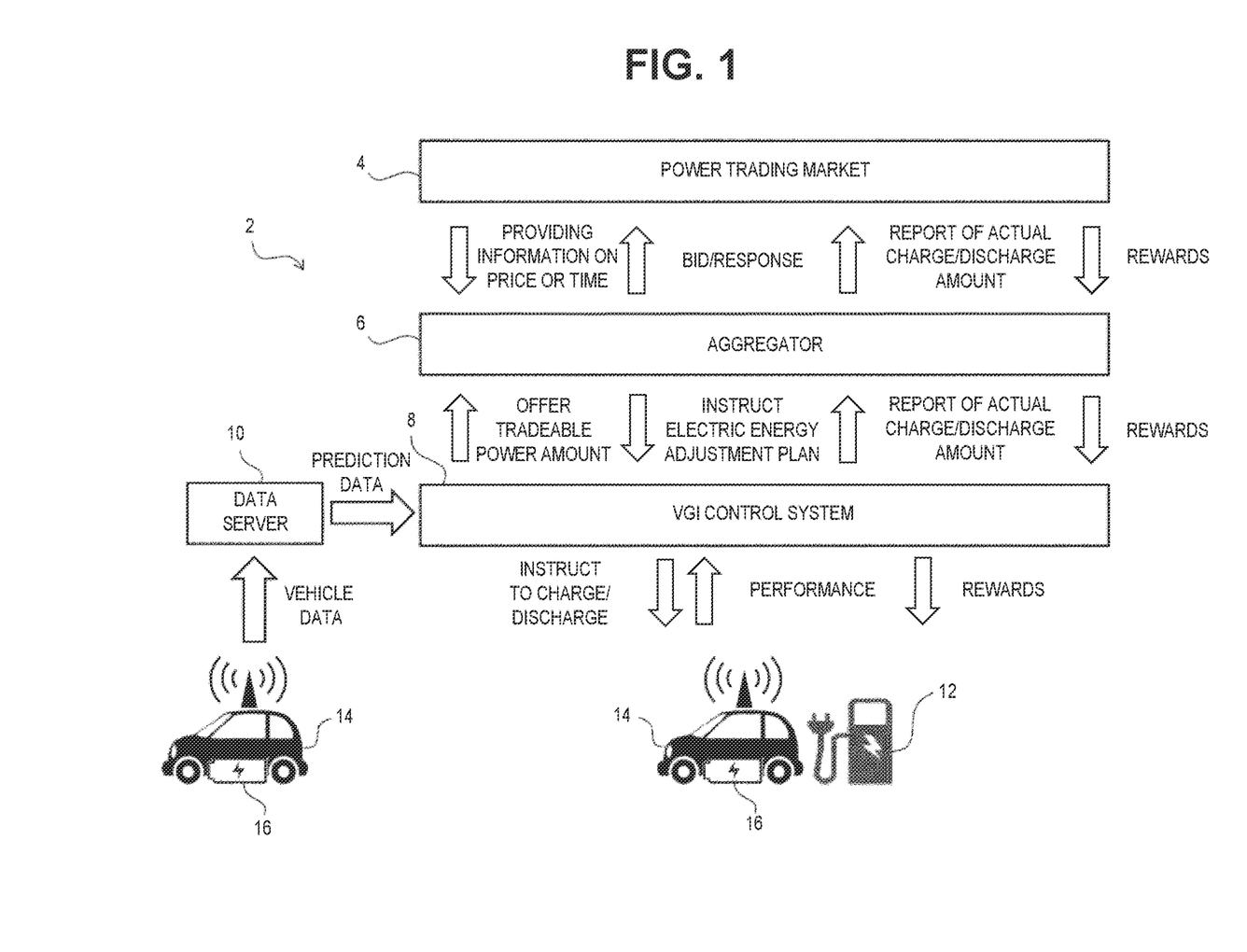
FIG. 1 is a diagram illustrating an overall configuration of VGI to which a behavior prediction device of an embodiment of the present disclosure is applied.

FIG. 1 is a diagram illustrating an overall configuration of VGI 2 according to an embodiment of the present disclosure. In the VGI 2, electric power is traded between a power trading market 4, an aggregator 6, and a VGI control system 8. Although FIG. 1 shows the power trading market 4 and the aggregator 6 in a one-to-one relationship, a plurality of aggregators 6 may be associated with one power trading market 4. Further, although FIG. 1 shows the aggregator 6 and the VGI control system 8 in a one-to-one relationship, a plurality of VGI control systems 8 may be associated with one aggregator 6.

The power trading market 4 asks the aggregator 6 for recruitment of power coordinators to balance supply and demand of electric power. The power trading market 4 provides the aggregator 6 with information such as a desired selling price of electric power and a time when the electric power is demanded, as well as the recruitment of the power coordinators. The aggregator 6 determines whether to bid or respond to an offer based on the information presented by the power trading market 4. In a case where the aggregator 6 bids or responds to the offer from the power trading market 4 and electric power transaction is established between the power trading market 4 and the aggregator 6, the aggregator 6 is charged/discharged using the VGI control system 8 so as to adjust the electric power. The aggregator 6 reports an actual charge/discharge amount achieved by the VGI control system 8 to the power trading market 4, and receives rewards from the power trading market 4.

The aggregator 6 receives a one-day-ahead report from the VGI control system 8 on an amount of electric energy that the VGI control system 8 can trade with the aggregator 6 (hereinafter, referred to as "tradeable power amount"). An amount of electric energy for charge/discharge requested to the VGI control system 8 and a time required for charge/discharge are calculated based on the tradeable power amount offered, and an electric energy adjustment plan is submitted to the VGI control system 8 by the day before or the morning of the day when the electric power adjustment is needed. The VGI control system 8 totals the amount of electric energy charged to the vehicle 14 engaging in the VGI 2 and the amount of electric energy discharged from the vehicle 14, reports the result to the aggregator 6, and gets rewards from the aggregator 6. A vehicle 14 engaging in the VGI 2 is an electric vehicle, such as a pure electric vehicle (EV) or a plug-in hybrid vehicle (PHV). The EV is a vehicle that runs by an electric motor using only a battery 16 as an energy source. The PHV is a vehicle having an electric motor and an internal combustion engine, and can directly charge, from the outside, the battery 16 which is an energy source of the electric motor.

The VGI control system 8 instructs each vehicle 14 to charge/discharge based on the electric energy adjustment plan received from the aggregator 6, and transmits control data to a charge/discharge stand 12 under the control of the VGI control system 8. Charge/discharge instructions are given by mobile communication such as 4G or 5G. The control data is transmitted via a communication network such as the Internet. The vehicle 14 instructed to charge/discharge is connected to the charge/discharge stand 12, and charging/discharging power of each vehicle 14 is adjusted by performing charging/discharging between the charge/discharge stand 12 and the vehicle 14 according to the control data.

Further, a data server 10 is used in the VGI 2. The data server 10 controls data of all the vehicles 14 engaging in the VGI 2. The data controlled by the data server 10 includes a vehicle ID for identifying the vehicle 14, a current location of each vehicle 14, a state of charge and deterioration of the battery 16 in each vehicle 14, and past behavior history of each vehicle 14. The behavior history of the vehicle 14 includes history of departure time, history of return time, history of parking places, history of mileage (or history of running energy), and the like. The data server 10 receives vehicle data from each vehicle 14 by mobile communication, and updates the data of each controlled vehicle 14 to the latest information.

The data controlled by the data server 10 is used in the VGI control system 8 for behavior prediction for each vehicle 14. The behavior prediction of the vehicle 14 in the VGI control system 8 will be described in detail hereinbelow.

2. Configuration of VGI Control System

Figure 2:
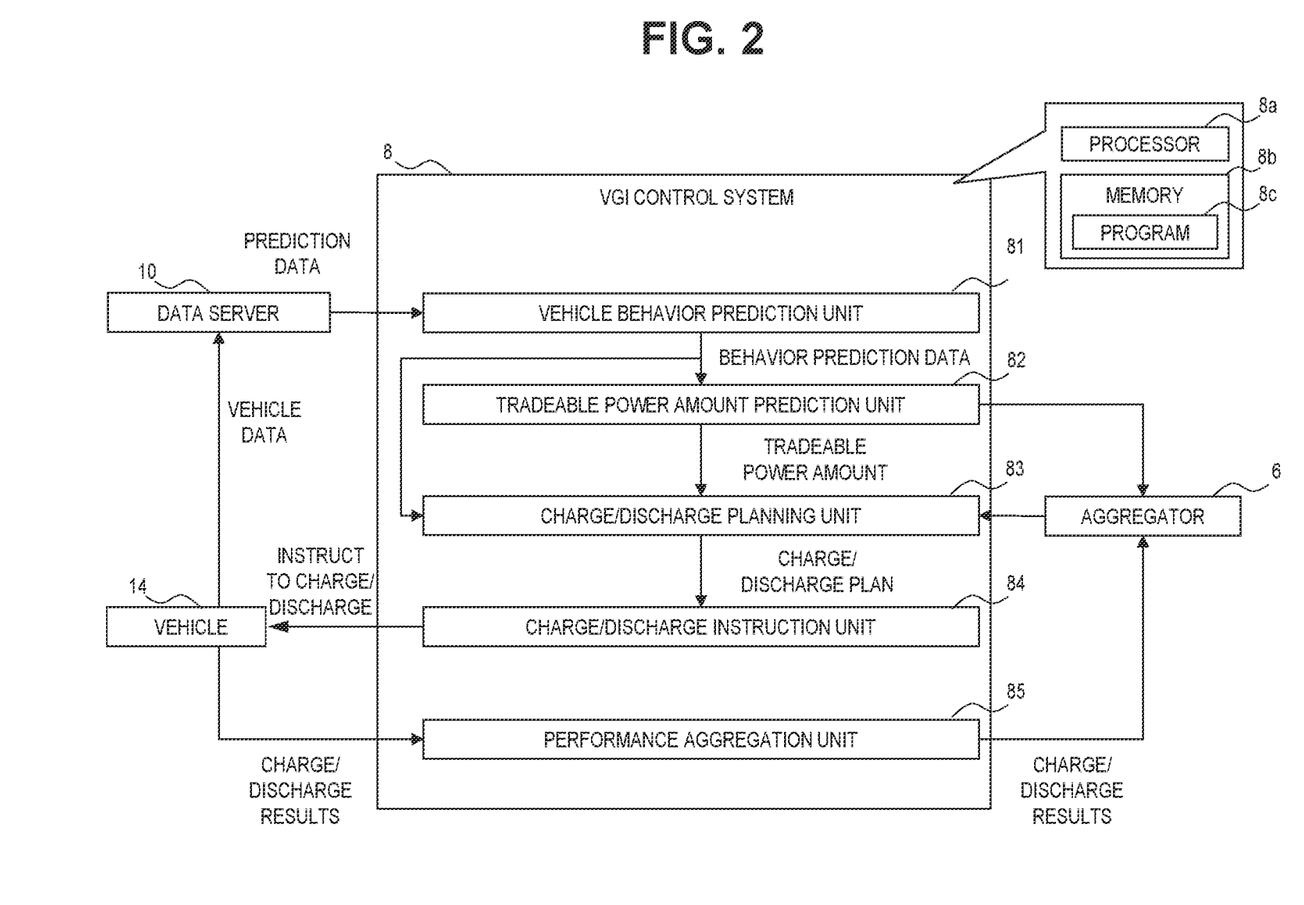
FIG. 2 is a block diagram illustrating a configuration of a VGI control system including the behavior prediction device according to the embodiment of the present disclosure.

A configuration of the VGI control system 8 will be described with reference to FIG. 2. FIG. 2 is a block diagram illustrating the configuration of the VGI control system 8. The VGI control system 8 includes at least one processor 8a (hereinafter, simply referred to as a processor) and at least one memory 8b (hereinafter, simply referred to as a memory) coupled to the processor 8a, as its physical configuration. At least one program 8c (hereinafter, simply referred to as a program) that can be executed by the processor 8a, and various types of data related thereto are stored in the memory 8b. When the program 8c is executed by the processor 8a, various processes are implemented by the processor 8a.

The VGI control system 8 includes a vehicle behavior prediction unit 81, a tradeable power amount prediction unit 82, a charge/discharge planning unit 83, a charge/discharge instruction unit 84, and a performance aggregation unit 85. These units are implemented as functions of the VGI control system 8 when the program 8c stored in the memory 8b is executed by the processor 8a. In particular, the vehicle behavior prediction unit 81 is a function of the VGI control system 8 as the behavior prediction device of the present embodiment.

The vehicle behavior prediction unit 81 individually predicts behaviors of all the vehicles 14 engaging in the VGI 2, for example, behavior of the vehicle 14 tomorrow. The behavior of the vehicle 14 predicted by the vehicle behavior prediction unit 81 includes departure time, return time, parking place, history of mileage (or running energy), and the like. For the behavior prediction of the vehicle 14 by the vehicle behavior prediction unit 81, prediction data acquired from the data server 10 is used. Functions of the vehicle behavior prediction unit 81 will be described in detail later. The vehicle behavior prediction unit 81 gives behavior prediction data obtained by the behavior prediction unit 81 for each vehicle 14 to the tradeable power amount prediction unit 82 and the charge/discharge planning unit 83.

The tradeable power amount prediction unit 82 predicts a tradeable power amount based on the behavior prediction data for each vehicle 14 given by the vehicle behavior prediction unit 81. The state of charge (SOC) of the battery 16 in the vehicle 14 depends on the behavior of the vehicle 14, and an opportunity for the vehicle 14 to charge or discharge at the charge/discharge stand 12 also depends on the behavior of the vehicle 14. Therefore, if the behavior of the individual vehicle 14 can be predicted for tomorrow, a charge/discharge amount for each vehicle 14 can be predicted. The tradeable power amount can be predicted by aggregating predicted values of charge/discharge amounts for all the vehicles 14. The tradeable power amount prediction unit 82 calculates a predicted value of the charge/discharge amount for each vehicle 14 from the behavior prediction data for each vehicle 14, aggregates the predicted value of the charge/discharge amount for each vehicle 14, and calculates a tradeable power amount.

The charge/discharge planning unit 83 prepares a charge/discharge plan for each vehicle 14 for satisfying the electric energy adjustment plan, based on the electric energy adjustment plan acquired from the aggregator 6 and the behavior prediction data for each vehicle 14 provided by the vehicle behavior prediction unit 81. The charge/discharge planning unit 83 draws up a charge/discharge plan to be optimized to achieve, for example, both maximized electric revenue and minimized deterioration of the battery 16 to the extent that a route on which the vehicle 14 is scheduled to travel is not disturbed. The charge/discharge planning unit 83 provides a draft charge/discharge plan to the charge/discharge instruction unit 84.

The charge/discharge instruction unit 84 instructs each vehicle 14 to charge/discharge according to the charge/discharge plan provided by the charge/discharge planning unit 83. The charge/discharge instruction unit 84 may send instructions to a car navigation system or an information terminal owned by the user of the vehicle 14 when the vehicle 14 is instructed to charge/discharge. Alternatively, if it is determined by a contract, for example, that charging/discharging is to be performed as instructed, an electronic control unit (ECU) that controls the vehicle 14 may be instructed to charge/discharge the vehicle 14. Although not shown, the charge/discharge instruction unit 84 transmits control data for each vehicle 14, which is created according to the charge/discharge plan, to the charge/discharge stand 12. The vehicle 14 is connected to the charge/discharge stand 12, and the charge/discharge stand 12 operates according to the control data, such that the vehicle 14 is charged/discharged according to the charge/discharge plan.

The performance aggregation unit 85 collects charge/discharge results for each vehicle 14 from each vehicle 14. The charge/discharge results may be collected directly from each vehicle 14 by mobile communication with the vehicle 14, or may be collected from the charge/discharge stand 12 that has charged or discharged the vehicle 14. The performance aggregation unit 85 totals the charge/discharge results collected from each vehicle 14 and calculates the charge/discharge results of the entire VGI control system 8. A charge/discharge record of the entire VGI control system 8 is reported to the aggregator 6.

As described above, the behavior prediction data for each vehicle 14 obtained by the vehicle behavior prediction unit 81 is used for calculating the tradeable power amount in the VGI control system 8, and further, for establishing the charge/discharge plan for each vehicle 14. Therefore, if it is possible to predict the behavior of the vehicle 14 with high accuracy, the tradeable power amount can also be predicted with high accuracy, thereby establishing a highly reliable charge/discharge plan. Consequently, the amount of electric energy that can be traded in the power trading market 4 increases, and charging/discharging can be reliably performed according to the charge/discharge plan for each vehicle 14 established in advance. That is, the VGI 2 can have improved profitability via the enhanced accuracy of the behavior prediction for the vehicle 14.

3. Configuration of Vehicle Behavior Prediction Unit

Figure 3:
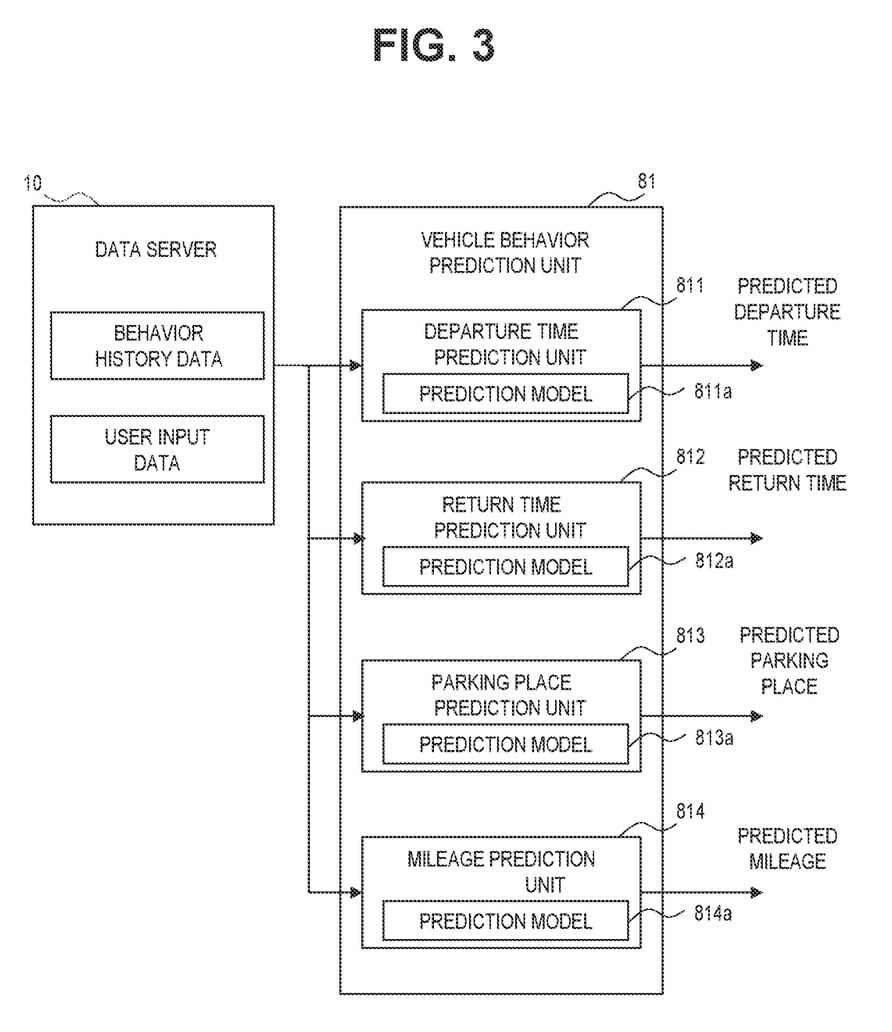
FIG. 3 is a block diagram illustrating a configuration of a vehicle behavior prediction unit as the behavior prediction device according to the embodiment of the present disclosure.

A configuration of the vehicle behavior prediction unit 81 will be described with reference to FIG. 3. FIG. 3 is a block diagram illustrating a configuration of the vehicle behavior prediction unit 81. In the following description, it is assumed that the behavior of the vehicle 14 predicted by the vehicle behavior prediction unit 81 includes departure time, return time, parking place, and mileage. Alternatively, instead of the mileage, electric energy obtained by multiplying the mileage (km) by the estimated electric cost (kWh/km), i.e., the electric energy used for the next journey, may be adopted.

The vehicle behavior prediction unit 81 includes a departure time prediction unit 811, a return time prediction unit 812, a parking place prediction unit 813, and a mileage prediction unit 814. These units are implemented as functions of the VGI control system 8, corresponding to the vehicle behavior prediction unit 81, when the program 8c stored in the memory 8b is executed by the processor 8a.

The departure time prediction unit 811, the return time prediction unit 812, the parking place prediction unit 813, and the mileage prediction unit 814 respectively include prediction models 811a, 812a, 813a, and 814a. The prediction models 811a, 812a, 813a, and 814a are statistical models for statistically predicting the future behavior of the vehicle 14 from the past behavior history, which are created by using, for example, Bayesian estimation or machine learning. Specifically, the prediction model 811a of the departure time prediction unit 811 is created based on past history data of the departure time, and is sequentially learned and updated based on the latest history data. The prediction model 812a of the return time prediction unit 812 is created based on past history data of the return time, and is sequentially learned and updated based on the latest history data. The prediction model 813a of the parking place prediction unit 813 is created based on past history data of the parking places, and is sequentially learned and updated based on the latest history data. The prediction model 814a of the mileage prediction unit 814 is created based on past history data of the mileage, and is sequentially learned and updated based on the latest history data.

The behavior history data and the user input data are input from the data server 10 to each of the departure time prediction unit 811, the return time prediction unit 812, the parking place prediction unit 813, and the mileage prediction unit 814. More specifically, the departure time prediction unit 811 is input with the departure time history data and the user input data. The departure time prediction unit 811 calculates the predicted departure time based on the data. The return time prediction unit 812 is input with the return time history data and the user input data. The return time prediction unit 812 calculates the predicted return time based on the data. The parking place prediction unit 813 is input with the parking place history data and the user input data. The parking place prediction unit 813 calculates the predicted parking place based on the data. The mileage prediction unit 814 is input with the mileage history data and the user input data. The mileage prediction unit 814 calculates the predicted mileage based on the data. Accordingly, the vehicle behavior prediction unit 81 calculates the predicted departure time, the predicted return time, the predicted parking place, and the predicted mileage independently from each other.

As described above, not only the behavior history data of the vehicle 14 but also the user input data is used in the behavior prediction of the vehicle 14 by the vehicle behavior prediction unit 81. The user input data is data associated with a scheduled behavior of the vehicle 14 input by the user who is using the vehicle 14. While the user input data is registered in the data server 10 together with the behavior history data as shown in FIG. 3, they may be registered in a server different from the data server 10. Hereinafter, an outline of the processing by the vehicle behavior prediction unit 81 will be described with reference to FIG. 4.

Figure 4:
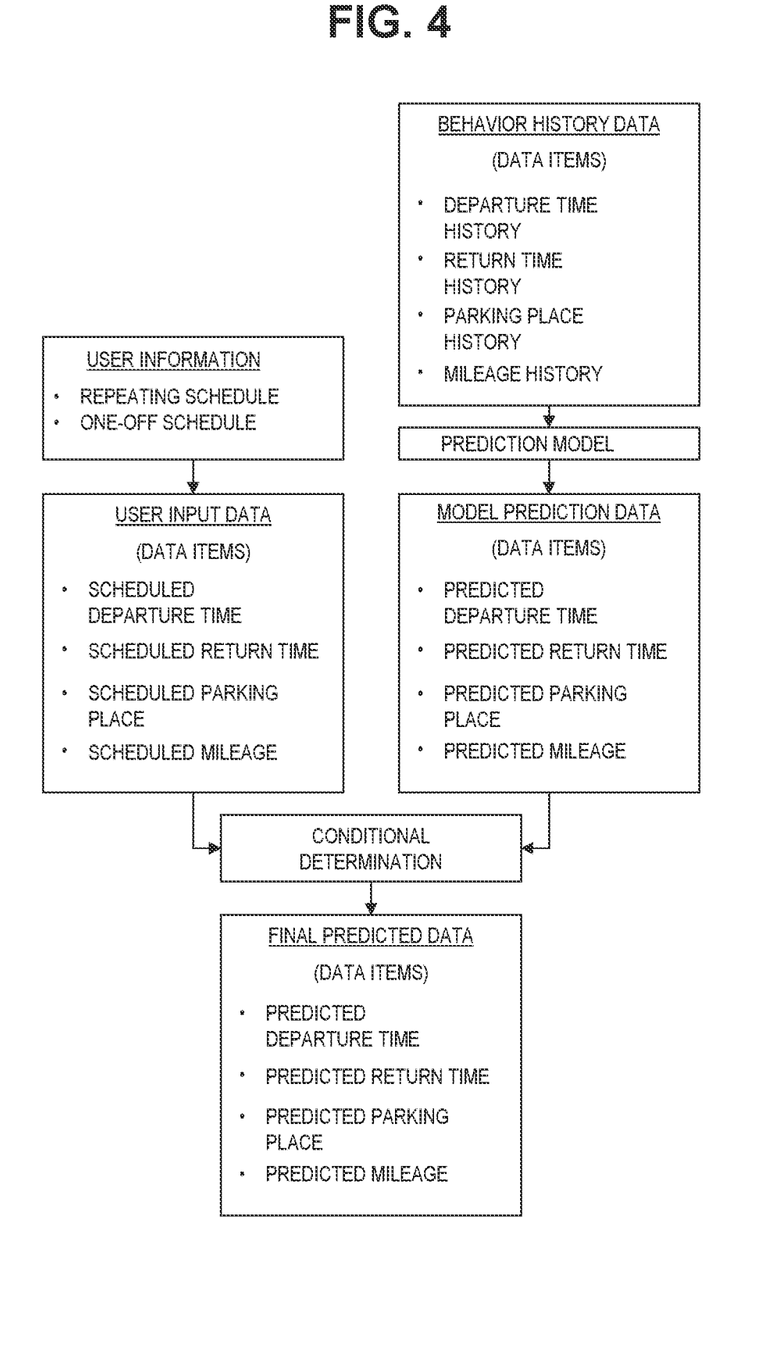
FIG. 4 is a diagram illustrating an outline of processing by the vehicle behavior prediction unit.

The latest behavior history data is input to the vehicle behavior prediction unit 81. The behavior history data includes history of departure time, history of return time, history of parking places, and history of mileage as data items. Each data item is represented numerically. The latest behavior history data input is used for updating learning of the prediction model. Upon updating learning of the prediction model, an attribute of a data acquisition date when the behavior history data was obtained is associated with the behavior history data. The attribute of the data acquisition date is an attribute that affects the behavior of the vehicle 14, such as a day of the week, a holiday, consecutive holidays, weather, and a season.

The vehicle behavior prediction unit 81 inputs an attribute of a prediction target date when the behavior of the vehicle 14 is to be predicted into the prediction model, and acquires model prediction data. For example, if the prediction target date is Monday, the forecasted weather is sunny, and the season is summer, those pieces of information are input to the prediction model as attributes of the prediction target date. The model prediction data obtained by the prediction model includes predicted departure time, predicted return time, predicted parking place, and predicted mileage as data items. Each data item is represented numerically.

The user input data is input to the vehicle behavior prediction unit 81. The user input data is data associated with the scheduled behavior of the vehicle 14 acquired from user information registered in a smartphone or a website such as the user's personal schedule. The scheduled behavior of the vehicle 14 includes, for example, a repeating schedule (fixed schedule) that is repeated on a weekly or monthly basis, and a one-off schedule that has been not and will not be repeated. The user input data includes scheduled departure time, scheduled return time, scheduled parking place, and scheduled mileage as data items. Each data item is represented numerically. However, it is not necessary that data is entered for all these data items. It is optional for the user to input these types of data, and the input data is used for predicting the behavior history of the vehicle 14 only when the user inputs the data.

The vehicle behavior prediction unit 81 selects either the model prediction data or the user input data as final prediction data according to conditional determination. The final prediction data includes predicted departure time, predicted return time, predicted parking place, and predicted mileage as data items. Each data item is represented numerically. The conditional determination is performed from the viewpoint of data reliability as described later in the flowchart. In other words, if it is determined that the user input data has higher reliability than the model prediction data, the user input data is determined as the final prediction data. If it is determined that the model prediction data has higher reliability than the user input data, the model prediction data is determined as the final prediction data. However, if the reliability varies for each data item, the final prediction data is selected for each data item. For example, the user input data may be used only for the predicted departure time, and the model prediction data may be used for other data items.

4. Vehicle Behavior Prediction Method

Figure 5:
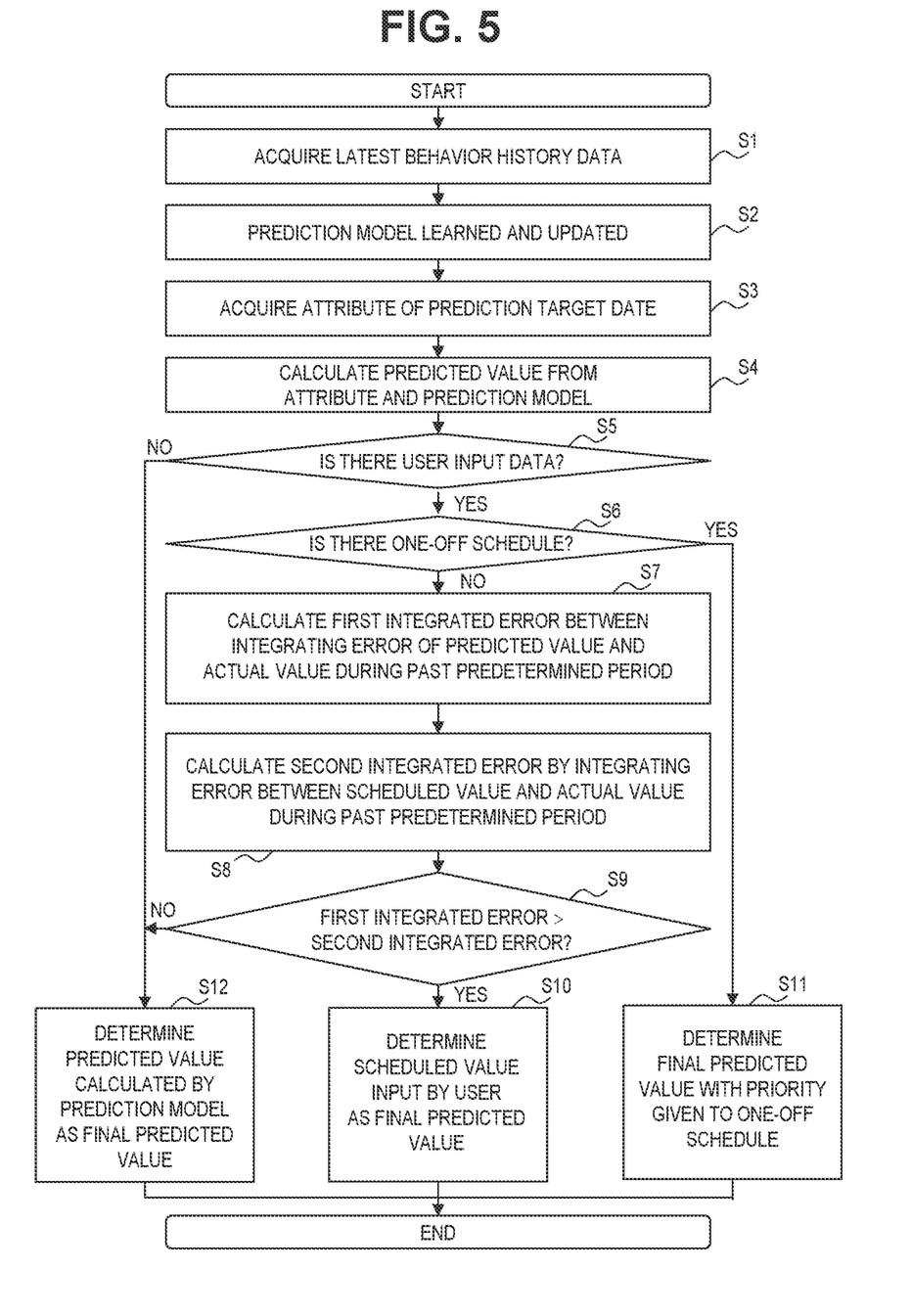
FIG. 5 is a flowchart illustrating a behavior prediction method according to the embodiment of the present disclosure.

In the present embodiment, the behavior prediction of the vehicle 14 is performed by the vehicle behavior prediction unit 81 with the configuration stated above. Hereinafter, the behavior prediction method performed by the vehicle behavior prediction unit 81 will be described with reference to FIG. 5. FIG. 5 is a flowchart illustrating a procedure of the behavior prediction method performed by the vehicle behavior prediction unit 81. The vehicle behavior prediction unit 81 executes the procedure shown in this flowchart for each data item.

According to the flowchart shown in FIG. 5, the latest behavior history data is acquired from the data server 10 in step S1. In step S2, the prediction data is learned and updated using the behavior history data acquired in step S1.

In step S3, the attribute of the prediction target date is acquired. If the attribute includes weather or temperature, the information is obtained from a weather forecast for the prediction target date. In step S4, the predicted value for the behavior of the vehicle 14 on the prediction target date is calculated by inputting the attribute, i.e., the prediction target date acquired in step S3, into the prediction model updated in step S2. The predicted value calculated in step S4 is a value of a data item to be predicted in the model prediction data shown in FIG. 4.

In step S5, it is determined whether the user input data is registered in the data server 10 for the data item to be predicted on the prediction target date, referring to the data server 10. In a case where no user input data is found for the data item to be predicted on the prediction target date, that is, the user has not input the data, step S12 is executed. In step S12, the predicted value calculated by the prediction model in step S4 is determined as the final predicted value. The final predicted value calculated in step S12 is a value of a data item to be predicted in the final prediction data shown in FIG. 4.

Upon the determination in step S5, in a case where the user input data is registered in the data server 10 for the data item to be predicted on the prediction target date, the next determination is carried out in step S6. In step S6, it is determined whether the user input data for which the registration is confirmed in step S5 includes the one-off schedule. If the user input data includes the one-off schedule, step S11 is executed. In step S11, the final predicted value is determined with priority given to the one-off schedule. The term "priority given to the one-off schedule" means that, in a case where the repeating schedule such as a weekly or monthly schedule is also registered on the prediction target date, the one-off schedule is determined as the final predicted value instead of the repeating schedule. Further, in a case where a plurality of one-off schedules are registered for the same data item on the prediction target date, the latest one-off schedule is determined as the final predicted value.

Upon the determination in step S6, in a case where there is only the repeating schedule such as a weekly or monthly schedule, without the one-off schedule, steps S7 and S8 are executed. In step S7, a first integrated error is calculated by integrating an error between the predicted value and the actual value during a predetermined period in the past. The predicted value herein is a numerical value representing the behavior of the vehicle 14 statistically predicted based on the past behavior history, which is the value of the data item to be predicted in the user input data shown in FIG. 4. The calculation equation of the first integrated error can be expressed by the following Equation 1. N in Equation 1 is the number of data pieces in the past predetermined period.

$$\text{First Integrated Error} = \sum_{n=1}^{N} |\text{Predicted Value}_n - \text{Actual Value}_n| \quad \text{(Equation 1)}$$

In step S8, a second integrated error is calculated by integrating an error between the scheduled value and the actual value during the past predetermined period. The scheduled value herein is a numerical value representing the scheduled behavior of the vehicle 14 input by the user, which is the value of the data item to be predicted in the user input data shown in FIG. 4. The calculation equation of the second integrated error can be expressed by the following Equation 2. N in Equation 2 is the number of data pieces in the past predetermined period.

$$\text{Second Integrated Error} = \sum_{n=1}^{N} |\text{Scheduled Value}_n - \text{Actual Value}_n| \quad \text{(Equation 2)}$$

In step S9, the first integrated error calculated in step S7 and the second integrated error calculated in step S8 are compared. The smaller the error between the predicted value and the actual value is, the higher the reliability of the predicted value is. Therefore, the first integrated error can be regarded as a numerical value associated with the reliability of the predicted value. Moreover, the smaller the error between the scheduled value and the actual value is, the higher the reliability of the scheduled value is. Therefore, the second integrated error can be regarded as a numerical value associated with the reliability of the scheduled value. Therefore, by comparing the first integrated error and the second integrated error, it is possible to determine which has higher reliability, the predicted value statistically predicted based on the past behavior history or the scheduled value input by the user.

Upon the determination in step S9, in a case where the first integrated error is larger than the second integrated error, step S10 is executed. In step S10, the scheduled value input by the user is determined as the final predicted value. On the other hand, in a case where the first integrated error is equal to or less than the second integrated error, step S12 is executed. In step S12, the predicted value acquired by the prediction model calculated in step S4, that is, the predicted value statistically predicted based on the past behavior history is determined as the final predicted value.

As described above, the user input data is not always required to be input for all the data items. Therefore, for example, the scheduled departure time may be entered but the scheduled return time may not be entered. In that case, the scheduled departure time input by the user is selected as the final predicted value for the departure time, but the predicted return time predicted by the prediction model may be selected as the final predicted value for the return time. In such a case, it cannot be said it is not likely that the final predicted value for the departure time will be later than the final predicted value for the return time. In order to address this problem, the vehicle behavior prediction unit 81 decides to use the previous value instead of adopting the current value in a case where the final predicted value for the departure time conflicts with the final predicted value for the return time.

5. Effect of Present Embodiment

According to the prediction model that statistically predicts the behavior of the vehicle 14 using the behavior history data of the vehicle 14, it is possible to predict regular behavior, such as weekday commuting, with high accuracy. However, on the other hand, it is difficult for the prediction model to respond to vehicles with sudden schedule changes or additions.

In the present embodiment, the prediction model not only calculates the predicted value of the behavior of the vehicle 14, but also receives the scheduled value representing the scheduled future behavior of the vehicle 14 from the user. A value with higher reliability when considering past behavior, from among the predicted value calculated by the prediction model and the scheduled value input by the user, is determined as the final predicted value. Consequently, it is possible to improve the prediction accuracy for the behavior of the vehicle 14 engaging in the VGI 2, and also to deal with vehicles that do not have a fixed behavior pattern. Moreover, in a case where the scheduled value input by the user includes the one-off scheduled value, the one-off scheduled value is determined as the final predicted value, superseding the predicted value calculated by the prediction model, and thus it is also possible to deal with the sudden schedule changes or additions of the vehicle 14.

What is claimed is:

1. A vehicle grid integration control system comprising:
at least one memory that stores at least one program;
at least one processor coupled to the at least one memory, wherein
the at least one processor is configured to:
individually predict behavior of a vehicle engaging in vehicle-grid integration:
calculate a predicted value obtained by statistically predicting future behavior of the vehicle based on past behavior history of the vehicle;
acquire a scheduled value that represents scheduled future behavior of the vehicle from a user who is using the vehicle;
calculate reliability of the predicted value based on an error between the predicted value and an actual value of behavior of the vehicle during a predetermined period in a past;
calculate reliability of the scheduled value based on an error between the scheduled value and the actual value during the predetermined period;
determine, in a case where the scheduled value has higher reliability than the reliability of the predicted value, that the scheduled value is a final predicted value for the future behavior of the vehicle;
determine, in a case where the scheduled value has reliability equal to or less than the reliability of the predicted value, that the predicted value is the final predicted value;
predict a tradeable power amount based on behavior prediction data for the vehicle; and
prepare a charge/discharge plan for the vehicle for satisfying an electric energy adjustment plan, based on the behavior prediction data for the vehicle;
instruct the vehicle to charge/discharge according to the charge/discharge plan; and
send instructions to a car navigation system or an information terminal owned by the user of the vehicle when the vehicle is instructed to charge/discharge electric energy to satisfy the electric energy adjust plan.

2. The vehicle grid integration control system according to claim 1, wherein the at least one processor is configured to, by executing the at least one program:
determine, in a case where the scheduled value includes a one-off scheduled value that represents a one-off schedule instead of a repeating schedule, the one-off scheduled value as the final predicted value, superseding the predicted value.

3. The vehicle grid integration control system according to claim 2, wherein the at least one processor is configured to, by executing the at least one program:
determine, in a case where the scheduled value includes a plurality of one-off scheduled values, a latest one-off scheduled value as the final predicted value.

4. The vehicle grid integration control system according to claim 1, wherein the at least one processor is configured to, by executing the at least one program:
calculate an integrated value of the error between the predicted value and the actual value as a numerical value associated with the reliability of the predicted value; and
calculate an integrated value of the error between the scheduled value and the actual value as a numerical value associated with the reliability of the scheduled value.

5. A behavior prediction method of predicting behavior of a vehicle engaging in vehicle-grid integration, the behavior prediction method comprising:
calculating, by at least one processor, a predicted value obtained by statistically predicting future behavior of the vehicle based on past behavior history of the vehicle;
acquiring, by the at least one processor, a scheduled value that represents scheduled future behavior of the vehicle from a user who is using the vehicle;
calculating, by the at least one processor, reliability of the predicted value based on an error between the predicted value and an actual value of behavior of the vehicle during a predetermined period in a past;
calculating, by the at least one processor, reliability of the scheduled value based on an error between the scheduled value and the actual value during the predetermined period;
determining, by the at least one processor, in a case where the scheduled value has higher reliability than the reliability of the predicted value, the scheduled value as a final predicted value for the future behavior of the vehicle;
determining, by the at least one processor, in a case where the scheduled value has reliability equal to or less than the reliability of the predicted value, the predicted value as the final predicted value;
predicting, by the at least one processor, a tradeable power amount of electric energy that can be exchanged between the vehicle and a power grid based on the predicted future behavior of the vehicle;
preparing, by the at least one processor, a charge/discharge plan for the vehicle for satisfying an electric energy adjustment plan, based on the predicted future behavior of the vehicle; and
instructing, by the at least one processor, the vehicle to charge/discharge according to the charge/discharge plan, wherein the charge/discharge plan is implemented by sending instructions to a vehicle navigation system of the vehicle or an information terminal owned by the user of the vehicle to cause the vehicle to one or both of charge with electric energy and discharge electric energy to satisfy the electric energy adjustment plan.

6. A non-transitory computer-readable medium storing instructions that, when executed on a computer, cause the computer to predict behavior of a vehicle engaging in vehicle-grid integration, the instructions causing the computer to:
calculate a predicted value obtained by statistically predicting future behavior of the vehicle based on past behavior history of the vehicle;
acquire a scheduled value that represents scheduled future behavior of the vehicle from a user who is using the vehicle;

calculate reliability of the predicted value based on an error between the predicted value and an actual value of behavior of the vehicle during a predetermined period in a past;

calculate reliability of the scheduled value based on an error between the scheduled value and the actual value during the predetermined period;

determine, in a case where the scheduled value has higher reliability than the reliability of the predicted value, the scheduled value as a final predicted value for the future behavior of the vehicle;

determine, in a case where the scheduled value has reliability equal to or less than the reliability of the predicted value, the predicted value as the final predicted value;

predict a tradeable power amount of electric energy that can be exchanged between the vehicle and a power grid based on the predicted future behavior of the vehicle;

prepare a charge/discharge plan for the vehicle for satisfying an electric energy adjustment plan, based on the predicted future behavior of the vehicle; and instruct the vehicle to charge/discharge according to the charge/discharge plan, wherein the charge/discharge plan is implemented by sending instructions to a vehicle navigation system of the vehicle or an information terminal owned by the user of the vehicle to cause the vehicle to one or both of charge with electric energy and discharge electric energy to satisfy the electric energy adjustment plan.

\* \* \* \* \*